US009547648B2

(12) United States Patent
Burke et al.

(10) Patent No.: US 9,547,648 B2
(45) Date of Patent: Jan. 17, 2017

(54) ELECTRONIC DOCUMENT INFORMATION EXTRACTION

(75) Inventors: Eric Burke, Northville, MI (US); Alan Wada, Mountain View, CA (US); Brian Coe, Scotts Valley, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 866 days.

(21) Appl. No.: 11/462,222

(22) Filed: Aug. 3, 2006

(65) Prior Publication Data

US 2008/0065737 A1   Mar. 13, 2008

(51) Int. Cl.
*G06F 15/16* (2006.01)
*G06F 17/30* (2006.01)

(52) U.S. Cl.
CPC ... *G06F 17/30035* (2013.01); *G06F 17/30058* (2013.01)

(58) Field of Classification Search
USPC .......................................... 709/203
See application file for complete search history.

(56) References Cited

U.S. PATENT DOCUMENTS

| | | | | |
|---|---|---|---|---|
| 5,754,939 A * | 5/1998 | Herz | ..................... | G06Q 20/383 348/E7.056 |
| 6,626,553 B2 * | 9/2003 | Zhao et al. | ..................... | 362/124 |
| 6,804,675 B1 * | 10/2004 | Knight | ............... | G06F 17/30702 707/754 |
| 6,826,553 B1 * | 11/2004 | DaCosta et al. | | |
| 6,973,458 B1 * | 12/2005 | Maeda | .............. | G06F 17/30864 |
| 7,065,483 B2 * | 6/2006 | Decary | ............. | G06F 17/30864 704/10 |
| 7,085,736 B2 * | 8/2006 | Keezer et al. | .................. | 705/27 |
| 7,240,067 B2 * | 7/2007 | Timmons | ...................... | 707/101 |
| 7,366,715 B2 * | 4/2008 | Liu | ..................... | G06F 17/3071 |
| 2002/0091688 A1 * | 7/2002 | Decary et al. | .................... | 707/6 |
| 2002/0111813 A1 * | 8/2002 | Capps | .............................. | 705/1 |
| 2004/0004632 A1 * | 1/2004 | Knight | ................ | G06F 3/04812 715/711 |
| 2004/0199497 A1 * | 10/2004 | Timmons | .......... | G06F 17/30864 |
| 2005/0125746 A1 * | 6/2005 | Viola | ................ | G06F 17/30011 715/853 |
| 2005/0138026 A1 * | 6/2005 | Liu et al. | .......................... | 707/5 |

(Continued)

OTHER PUBLICATIONS http://www.prnewswire.com/cgi-bin/stories.pl?ACCT=105 &STORY=/www/story/04-03-00/0001179796,"NBCi to Acquire Flyswat, Inc. to Bring Content and E-Commerce Direct To User . . . ".

*Primary Examiner* — Natisha Cox
(74) *Attorney, Agent, or Firm* — James J. DeCarlo; Greenberg Traurig LLP

(57) ABSTRACT

Methods and apparatus for extracting information from an electronic document, such as, for example, a webpage. An outline, such as, for example, the document object model, of a web page is analyzed for objects of interest, such as, photos, dates, email addresses, etc. The instructions defining which objects are objects of interests can be predetermined by the user and/or the network content provider. The user can be given the option to save objects of interest to their network account and the webpage and/or browser can be augmented with additional content related to identified objects. Objects transmitted to the network content provider are saved with an appropriate network service, for example, photos are saved in an online photo album.

25 Claims, 10 Drawing Sheets

(56) References Cited

U.S. PATENT DOCUMENTS

| | | | |
|---|---|---|---|
| 2005/0273706 A1* | 12/2005 | Manber et al. | 715/513 |
| 2006/0123341 A1* | 6/2006 | Smirnov | 715/708 |
| 2006/0136589 A1* | 6/2006 | Konig et al. | 709/224 |
| 2006/0200457 A1* | 9/2006 | McCammon | G06F 17/2785 |
| 2006/0242266 A1* | 10/2006 | Keezer | G06Q 30/0641 |
| | | | 709/218 |
| 2006/0288011 A1* | 12/2006 | Gandhi et al. | 707/10 |

* cited by examiner

500

ELECTRONIC DOCUMENT INFORMATION EXTRACTION

TECHNICAL FIELD

This disclosure is directed to computers and computer applications and, more particularly, to a system and method of remotely selecting interesting information from an electronic document to extract and store to a network user account.

BACKGROUND

The Internet contains a vast amount of information related to many different topics. Therefore, Internet content providers offer a variety of services to help users browse the wealth of information. For example, some websites offer search engines and/or Internet portal sites. Internet portals can present users with a number of different web services on one page so they can quickly find the information and/or services that they are looking for.

In order to further enhance a user's Internet experience, some Internet content providers maintain individual user accounts for different Internet users. Having an Internet account with a content provider allows the content provider to offer more personalized content and services. For example, an Internet user can be provided local news and weather reports when they access the content provider's website. In addition, the Internet content provider can provide a personal start page designed by the Internet user, it can maintain an Internet calendar for the user, and can offer a plurality of other services and information.

With the vast wealth of information available on the Internet, it can be easy for an Internet user to miss important information found on a webpage. In addition, when a user finds the information that they are looking for, it can be difficult and/or tedious to save the information to their personal Internet account and/or to find additional related information. Accordingly, there is a desire for methods and apparatus for extracting information from electronic documents, such as, for example, webpages, and for using that extracted information to enhance a browsing experience for an Internet user.

SUMMARY

In one embodiment, a method of saving network content for a network user having a network account with a network content provider is described. The method comprises: transmitting network content provider defined instructions for determining objects of interest in an electronic document displayable at a user computer; receiving at least one object from the network user, wherein the at least one object is identified by examining an object outline describing the electronic document; and saving the at least one object in a database associated with the network user, wherein the database is maintained by the network content provider.

In one embodiment, the network content provider defined instructions are created based on user information stored in the database associated with the network user. In one embodiment, the network content provider defined instructions are created based on network content provider preferences.

In one embodiment, the method further comprises determining at least one network service to which to save the at least one object.

In one embodiment, the at least one object is automatically sent to the network content provider.

In one embodiment, the network content provider further receives a request for a browser interface enhancement. In one embodiment, the browser interface enhancement is a context menu item.

In one embodiment, communication between the network user and the network content provider is made using a downloadable network toolbar communication protocol.

In one embodiment, the at least one object is a target object of a universal resource identifier. In one embodiment, the target object is extensible markup language for real simple syndication.

In one embodiment, a network computer operated by a network content provider can be configured to save network content for a network user. The network user can have a network account with the network content provider. The network computer comprises: instruction transmission computer code, the instruction transmission computer code being configured to transmit network content provider defined instructions for determining objects of interest in an electronic document displayable at a user computer; object receiving computer code, the object receiving computer code being configured to receive at least one object from the network user, wherein the at least one object is identified by examining an object outline describing the electronic document; and object saving computer code, the object saving computer code being configured to save the at least one object in a database associated with the network user, wherein the database is maintained by the network content provider.

In one embodiment, the network content provider defined instructions are created based on user information stored in the database associated with the network user. In one embodiment, the network content provider defined instructions are created based on network content provider preferences.

In one embodiment, the network computer further comprises determination computer code. The determination computer code can be configured to determine at least one network service to which to save the at least one object.

In one embodiment, the user computer comprises a downloadable toolbar stored thereon and wherein the network computer and the user computer communicate through a downloadable toolbar protocol.

In one embodiment, a graphical user interface for a browser program is described. The interface comprises: a user control section, the user control section comprising at least one button, the at least one button being configured to initiate a browser command; and a browser display area, the browser display area being configured to display an electronic document, the electronic document comprising objects and at least one augmented object selected from the objects that comprise the electronic document, the at least one augmented object being selected based on instructions defined by a network content provider.

In one embodiment, the at least one object is augmented by changing the code of the electronic document. In one embodiment, the augmentation to the at least one object is not visible to a network user until the user interacts with the at least one object.

In one embodiment, the graphical user interface further comprises a context menu. The content menu comprises an item that can be selected to save the at least one augmented object to a database associated with the network user. In one embodiment, the user control section comprises a downloadable network toolbar and the additional content menu item is received using a network toolbar communication protocol. In one embodiment, the at least one augmented object is transmitted to the network content provider using a network toolbar communication protocol.

In one embodiment, the toolbar comprises a dynamic button, the dynamic button being configured to be a shortcut to one of a plurality of network services offered by the network content provider, the one service being selected based on a last augmented object that a user interacts with.

In one embodiment, the augmented object was previously a link to a real simple syndication feed and is now augmented so that when a user selects the object, a prompt is displayed to the user providing the user with an option to add the real simple syndication feed to the user's real simple syndication aggregator.

Other objects and features will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference numerals depict like elements throughout the several views.

DETAILED DESCRIPTION OF EXEMPLARY EMBODIMENTS

Figure 1:
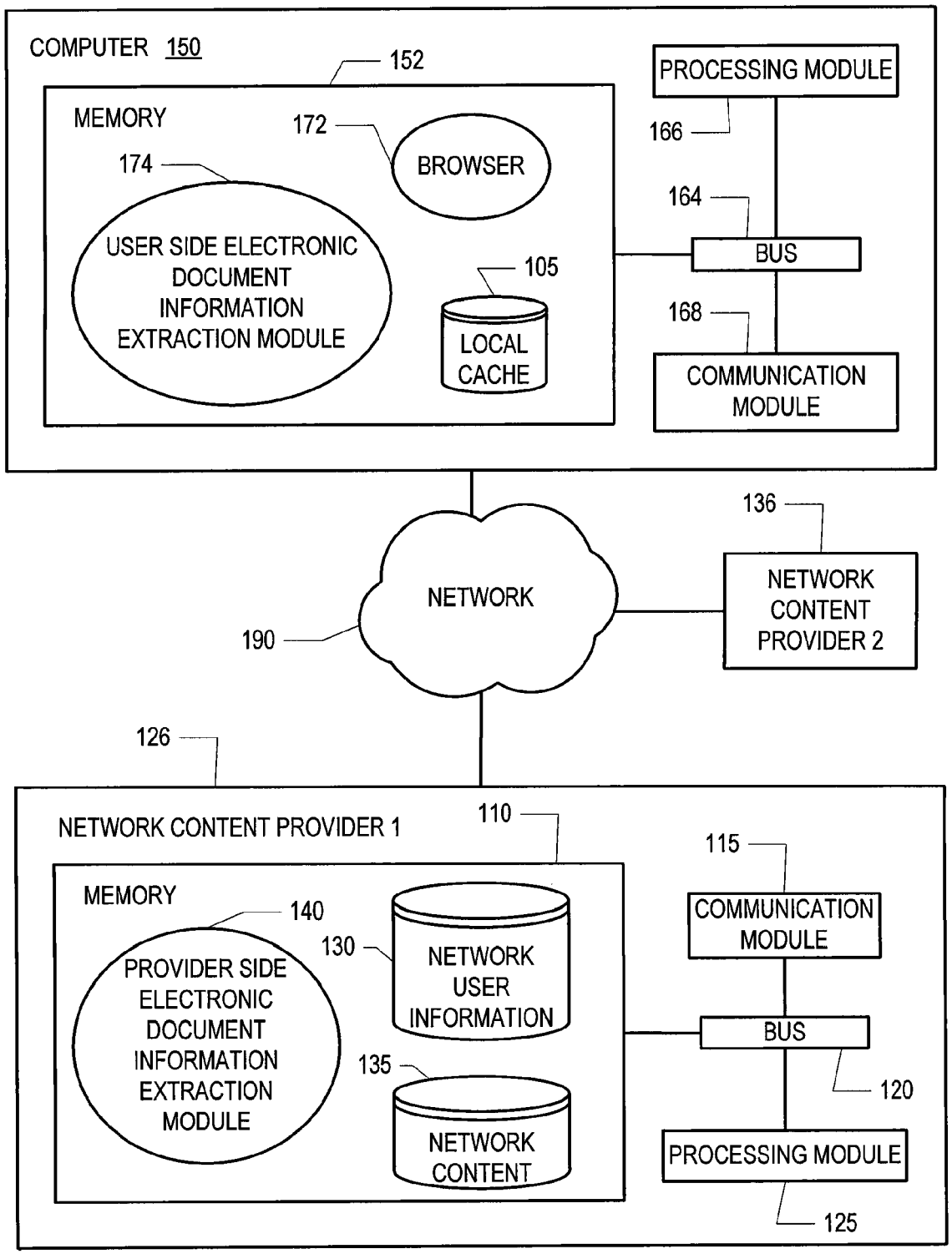
FIG. 1 illustrates an exemplary system implemented according to an embodiment.

There will now be shown and described in connection with the attached drawing figures several exemplary embodiments of method and systems for extracting information from electronic documents.

The term Internet as used herein, unless otherwise specified expressly or by context, is intended to have a broad non-limiting definition, and refers, without limitation, to a computer network and any other group of computers communicatively coupled together.

The term Internet and/or network content provider as used herein, unless otherwise specified expressly or by context, is intended to have a broad non-limiting definition, and refers, without limitation, to an Internet provider of content and services, such as, for example, news, email, directions, instant messaging, syndication aggregation and other content and services. These services can be provided through an Internet browser, a plug-in to an Internet browser, a computer application, and any other module executable to perform instructions on a computer. One example of an Internet content provider is Yahoo! inc. of Sunnyvale Calif.

A network content provider can maintain a user account for a network user to offer personalized services, such as, for example, email, photo albums, stock portfolios, online calendars, RSS feeds and other services. Personal preferences and other user data can also be stored by the network content provider in scalable databases.

In one embodiment, information that is stored by the personalized services for the user is automatically extracted from the webpages that a user visits. In one embodiment, information, such as, for example, a picture, a name, a date, a time, an address, a phone number, an email address, an instant message (IM) identifier, a web address, a stock symbol, a universal resource identifier (URI), a target of a URI, an XML page, and the like are extracted from an electronic document, for example, a webpage, by examining an object outline, such as, for example, a document object model (DOM). The extracted information can then be sent to the network content provider to be saved in the network user's account under the appropriate service and/or services.

In one embodiment, the network user can provide predetermined instructions regarding which objects and/or information are objects of interest that they want saved to their account. When those predetermined objects are identified in a DOM, they are automatically sent to the network content provider for saving. In one embodiment, in addition or in place of the predetermined user instructions, the network content provider can send network content provider determined instructions to the network user's computer. The objects of interest identified via the network content provider determined instructions may be based, in one embodiment on past user Internet usage, user service usage, objects that are of interest to the network content provider and/or other factors that would be interesting or preferable to either the user and/or the network content provider.

In one embodiment, rather than automatically saving objects of interest, computer code can be executed at the user computer to augment or upgrade the user's browser, a browser plug-in and/or the electronic document itself to offer selectable save options for the network user. For example, in one embodiment, if a user "right-clicks" over an object of interest, a context menu comprising a "save-to-network" option can be displayed to the user, thereby giving the network user the option of saving the object to their network account.

In one embodiment, identified objects of interest in a webpage, can be augmented to indicate to the user that additional functionality is available to them. For example, all the objects of interest on a webpage can be bolded, or an identified object can be configured to become bolded if a user moves their pointer over the object. In one embodiment, the HTML code describing the electronic document can be altered to include these changes.

In an embodiment, a network user can transmit to a network content provider, a request for additional network content related to an identified object. In response to receiving a request for additional information, the network content provider can retrieve the additional related content and transmit the related content to the user. In one embodiment, the additional content is transmitted to the user computer and then added to the user's interface. In one embodiment, the additional content can appear in a pop-up menu, when a user "left-clicks" on an object of interest. Examples of additional related content include a stock chart, movie times, search results, real simple syndication links, advertisements, etc. In one embodiment, the additional content that is transmitted to a user computer is based on other information stored in the user's account. For example, the stock charts of companies in a user's stock portfolio are sent to the user when the companies are identified in a webpage.

In one embodiment, the process of adding an RSS feed can be simplified. Currently, when an Internet user clicks on an orange XML button, they are taken to a webpage with XML code. In one embodiment, an information extraction module can augment orange XML buttons so that when an XML button is clicked on, the button automatically subscribes a user to the associated RSS feed, rather than taking the user to the XML code. In one embodiment, a "subscribe to RSS feed" menu item can be added to a content menu, that can appear if a user clicks or hovers over the orange XML button.

Some network users have enhanced their browser with a downloadable network toolbar that comprises buttons, which improve a browsing experience. For example, a network toolbar can comprise a search field/button, a shopping button, and other helpful features. In one embodiment, communication between a network user and a network content provider is made via the communication protocol of a downloadable network toolbar, for example using invisible buttons.

In addition, in one embodiment, the toolbar comprise one or more buttons that works with an information extraction method. For example, an information extraction method button can change it appearance according to the object a user is interacting with. For example, a network toolbar button can provide a shortcut to an online photo album when a network user is pointing at a photo, and can change to a shortcut to an online address book when the user is pointing at an address.

With reference to FIG. 1, there is shown an exemplary block diagram of a system 100 implemented in accordance with one embodiment. System 100 comprises a computer 150, a network content provider one 126, and a network content provider two 136, each coupled to a network 190, such as, for example, the Internet 190. A network user can use computer 150 to access content and/or services from providers 126 and 136 through the network 190.

Computer 150 comprises a processing module 166, a communication module 168 and memory 152 coupled together by bus 164. The modules of computer 150 can be implemented as any combination of hardware, software, hardware emulating software and reprogrammable hardware. The bus 164 is an exemplary bus illustrating the interoperability of the different modules of the computer 150. In different embodiments, there may be more than one bus and in other embodiments, some modules can be directly coupled instead of coupled to a bus 164. In one embodiment, computer 150 may be a desktop, a notebook computer, a Personal Digital Assistant (PDA), a handheld device, a wireless phone or any other device known or hereafter developed that is capable of performing functions as described herein.

The processing module 166 can be implemented as, in an exemplary embodiment, one or more Central Processing Units (CPUs), Field-Programmable Gate Arrays (FPGA), or any other component capable of executing computer applications. Communication module 168 comprises one or more I/O components used by the computer 150 to communicate with users and other devices. For example, components such as, a monitor, a keyboard, a mouse and a disk drive, can be used by a user to input and output information from the computer 150.

In addition, the communication module 168 facilitates two way communication between the computer and other electronic devices or systems, such as, for example, server computers provided by a network content provider one 126 and/or two 136. Components such as a modem, a network interface card (NIC), a wireless adapter, a Universal Serial Bus (BUS) adapter, etc., can be used by the computer 150 to communicate with the network 190, and/or with peripheral devices. The computer 150 may be communicatively connected to the network 190 through the communication module 168, for example, over one or more transmission media including but not limited to coaxial cable, copper wires and fiber optic cables. Communication between the computer 150 and the network 190 may also be accomplished via wirelessly.

Memory 152 can be implemented as volatile memory, non-volatile memory, rewriteable memory, etc., such as, for example, Random Access Memory (RAM), Read Only Memory (ROM) and/or flash memory. Memory 152 is illustrated as a single module in FIG. 1, but in some embodiments, memory 152 can comprise more than one memory module and some memory 152 can be part of other modules of computer 150, such as, for example, processing module 166.

In the embodiment illustrated in FIG. 1, memory 152 has stored thereon a browser 172, a user side electronic document information extraction module 174 and a local cache 105. A network user using computer 150 may gain access to content on the network 190, for example, the Internet 190, by using a browser 172. For example, a network user browsing the Internet 190 can use Universal Resource Identifiers (URIs), such as, for example, Universal Resource Locators (URLs), to locate and communicate with network content/service providers. In an embodiment, connection to the network 190 is provided through an Internet Service Provider (ISP).

Network content provider 136 and network content provider 126 can be implemented as computers, such as, for example, servers, connected to the network 190. Network content provider 136 has stored thereon, electronic documents that can be sent to computer 150 and viewed through the browser 172. Electronic documents can be saved in a local cache 105, for quick retrieval.

Electronic documents can comprise a plurality of elements, such as, for example, Hypertext Markup Language (HTML), electronic images, Portable Document Files (PDFs), flash files, etc. In addition, the identifier, such as, for example, the URL, associated with the electronic document can be consider as an element of the electronic document. On the Internet, an electronic document can be a webpage. Network content provider 136 can also have stored thereon, plug-ins, that can be downloaded onto the computer 150 and add functionality to the browser 172. Examples of plug-ins are downloadable network toolbars, media players, etc.

In addition, to providing electronic documents, services, such as, for example, shopping, banking, music, email, and planners, can also be provided over the network 190. Network content provider one 126 can provide services, as well as content, to a network user via the browser 172. User side electronic document information extraction module 174 represents computer readable instructions, such as for example, computer code, that can execute various routines to perform network services at the computer 150.

User side electronic document information extraction module 174 can be a separate application, a plug-in to browser 172, or a part of a plug-in to a browser. When providing services over the network 190, computer processing can be performed at the user computer 150, the network content provider 126 computer, or at both devices. Therefore, in one embodiment, user side electronic document information extraction module 174 may not be necessary, and the network service can be performed using standard browser functionality. As will be described in further detail below, in one embodiment, user side electronic document information extraction module 174, can be implemented as a service of a network toolbar. The communication protocol used by the network toolbar and the network content provider one 126 can be used to provide an information extraction service as described below.

In one execution of user side electronic document information extraction module 174, a network user downloads an electronic document, such as, for example, a webpage, from a network content provider 126, 136. The user side electronic document information extraction module 174, then examines an object outline, such as, for example, a document object model (DOM), which describes the webpage, and looks for objects that may interest the network user and/or the network content provider. An object can be any part of the electronic document. For example, objects can be images, documents, a name, a date, a time, a street address, a phone number, an email address, an instant message (IM) identifier, a URL, a company name, a movie title, a pointer to another object, etc.

As mentioned above instructions for identifying objects of interest can be determined by the user, for example, by choosing from a list of objects, and/or objects of interest can be selected by a network content provider. The network content provider can try to guess which objects might interest the user and/or the network content provider can instruct the module 174 to identify objects that are important to the provider, such as, for example, an advertiser and/or a new service.

After an object is identified, the user side electronic document information extraction module 174 can augment the network user's interface, which can comprise the electronic document and the browser, to assist the user in finding and saving the identified objects. For example, identified objects can be bolded. In addition, in one embodiment, identified objects can be automatically saved to a user's Internet account. For example, names and email address can be added to the network user's contacts, dates and times can be add to a network user's online calendar, and IM identifiers can be added to a network user's buddy list. In addition, the user's network interface can be augmented with additional information that is related to an identified object. For example, movie times for an identified movie and/or stock charts for an identified company can be displayed in a pop-up menu, when the network user hovers a mouse pointer over the object.

Network content provider 126 comprises communication module 115, processing module 125 and memory 110 coupled together by bus 120. Communication module 115, processing module 125, memory 110 and bus 120 can be implemented with components that are similar to the like named components of computer 150. The memory 110 of network content provider 126 has stored thereon, provider side electronic document information extraction module 140, network user information 130 and network content 135.

Network account information, such as, for example, user name, password, bookmarks, client settings, email messages, contacts, buddy lists, etc. is stored by the network content provider one 126 in network user information 130. Although, FIG. 1 depicts network user information 130 as a single database, user information can be spread across a plurality of different computers and geographic locations. Network content provider one 126 also comprises network content 135, which comprises the electronic documents, such as, for example, webpages, that a network user can access from the provider 126. Network content 135 can be made available via a plurality of computers over the network 190.

As will be described in further detail below, after objects of interest are identified by the user side electronic document information extraction module 174, the module 174 can send the objects to the network content provider one 126 for saving as part of network user information 130. Network content provider one 126 comprises provider side electronic document information extraction module 140, to receive and process information from network users for an information extraction service. As mentioned above, the information extraction service can be part of a network toolbar service, therefore module 140 can be part of a server side toolbar module. In alternate embodiments, the provider side electronic document information extraction module 140, can analyze and augment electronic documents at the provider's 126 location and send the augmented document to the computer 150 for display on the browser 172.

Figure 2:
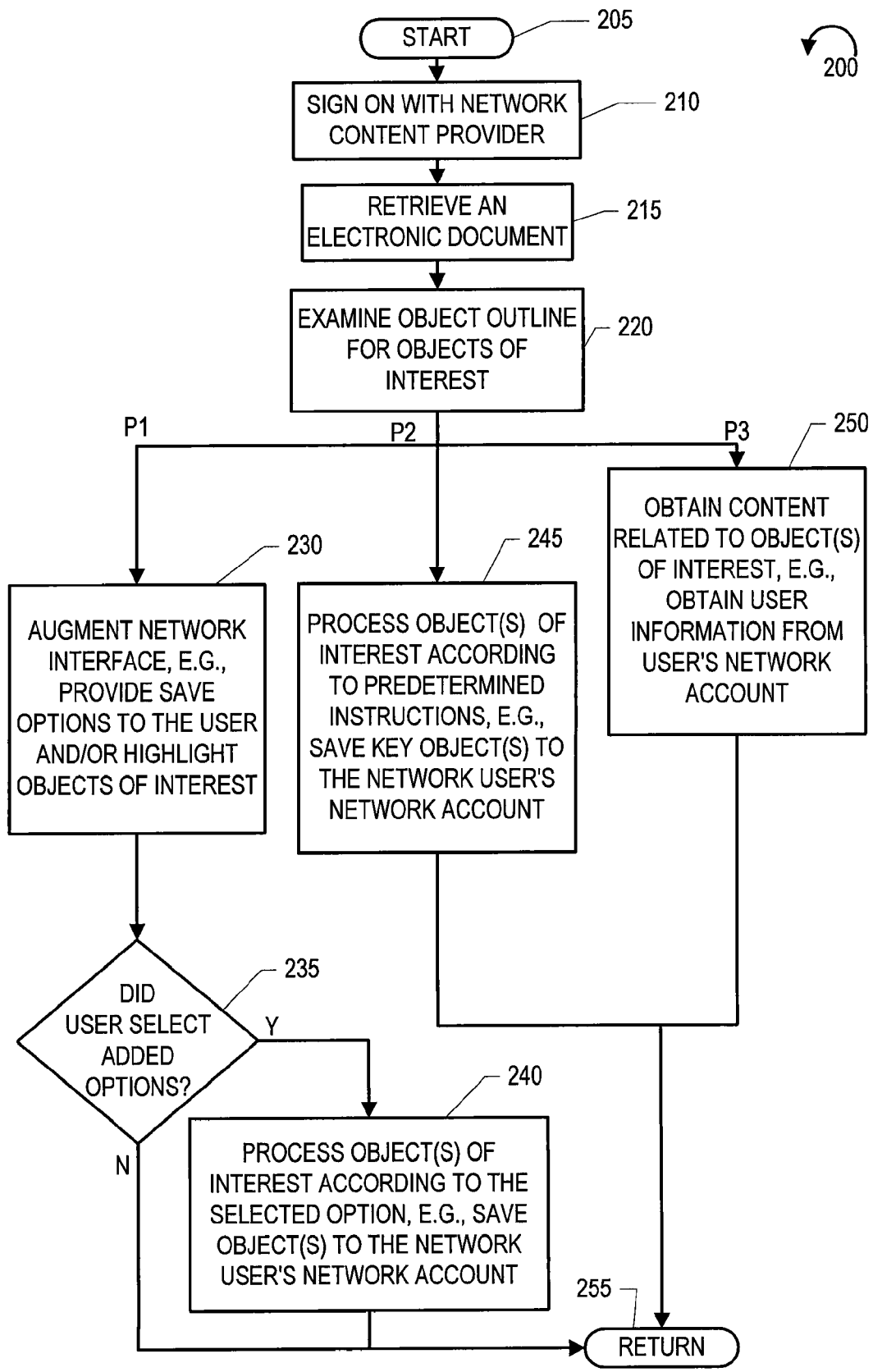
FIG. 2 illustrates a user side electronic document information extraction method implemented according to an embodiment.

FIG. 2 illustrates an exemplary user side electronic document information extraction method 200, implemented in accordance with one embodiment. In one embodiment, user side electronic document extraction module 174 of computer 150 in FIG. 1, can execute method 200. The user side method 200 starts in step 205. The electronic document information extraction can be implemented over a plurality of different types of networks, including, for example, the Internet.

Following start step 205, method 200 proceeds to step 210 where a user can sign on with a network content provider. For example, an Internet user can use a browser 172 to visit the website of a network content provider 126 and sign on with that network content provider 126. In one embodiment, the Internet user's browser 172, a plug-in to the browser 172, such as, for example, a downloadable network toolbar, and/or another program can automatically sign on with the network content provider 126 when the browser 172 and/or another program is executed. After a network user has signed on with the network content provider 126, in step 210, method 200 proceeds to step 215, where the network user browses the network and retrieves an electronic document, such as, for example, a webpage. In some instances, a network user may not have an account with a network content provider or a network user may not be logged into their account. In these cases, the user side electronic document information extraction module 174 can sign on as a default user, and provide a generic and/or regional experience.

Following step 215, method 200 proceeds to step 220 where an object outline that describes the retrieved electronic document, such as, for example, a document object model (DOM), is examined for objects that might interest the user and/or the network content provider. For example, objects can be a picture, metadata, a name, a date, a time, an physical address, a telephone number, an email address, an IM identifier, a webpage, a company, a movie, a product, an XML link, a target to another webpage or any other identifiable object. In one embodiment, objects of interest can be predetermined by a network user. In one embodiment, in addition to or in place of the user selecting objects of interest, a network content provider can decide which objects are objects of interest.

For example, in one embodiment, the network content provider can guess which objects might interest a user by measuring what interested the user in the past and/or by measuring what other users find interesting. In one embodiment, the network content provider can select objects that are important to the network content provider, such as, for example, an advertising sponsor. In one embodiment, the number of identified objects of interest for a given electronic document can be limited a certain number, so a network user is not overwhelmed by their choices.

In one embodiment, user side electronic document information extraction module 174 performs the examination of the object outline. In one embodiment, the electronic document can be sent to the network content provider 126 and the object outline can be examined there by the network content provider. In one embodiment, the network content provider one 126 can act as a proxy to the network user and intercept and examine all electronic documents browsed by the user.

Following step 220, method 200 can take a number of processing paths. For example, following path P1, method 200 proceeds from step 220 to step 230 where at least one part of the user's network interface, which can comprise the retrieved electronic document and/or the browser, is augmented with additional elements. For example, identified objects of interest can be highlighted, bolded or otherwise augmented, so that the network user can more readily identify them. In alternate embodiments, the augmented objects change their appearance only after a user hovers their mouse pointer over the object. In one embodiment, an augmented context menu appears when a user "right-clicks" over an object. The augmented context menu includes an option to save an object of interest to the user's network account.

In one embodiment, a network user's browser 172 can have a downloadable network toolbar added to its interface. In one embodiment, the downloadable toolbar can have dynamic buttons that can change depending on the identified object of interest a user is interacting with.

Following step 230, method 200 proceeds to step 235 where the user side electronic document information extraction module 174 determines if the network user selected any of the added options, such as, for example, a "save to network account" option. If a user selects an added option, method 200 proceeds from step 235 to step 240 where the object that is selected is processed according to the selected option. For example, if a save option was selected, the identified object can be saved to the user's network account.

In one embodiment, depending on the type of the identified object, the object can be processed in a number of different ways at the network content provider one 126. In one embodiment, the network content provider one 126 determines which Internet service and/or services can properly use the identified object. Then, the network content provider appropriately saves the identified object with its related service and/or service. For example, photos can be saved to a picture album; names, addresses, telephone number, etc. can be saved to a contacts list; IM identifiers can be added to a user's buddy list and dates can be added to the user's calendar.

In one embodiment, the user side electronic document information extraction module 174 can comprise computer code configured to automatically determine a network content provider service that can appropriately store the identified object. Thus, the identified object is sent to the network content provider one 126 as data for a particular service or services.

Following step 240 processing proceeds to step 255 where the method 200 returns, for example, to step 215 where the network user retrieves another electronic document. In addition, in one embodiment, the method 200 can end in step 255 when, for example, a user logs off the network and/or closes their browser. Returning to step 235 if a user does not select any of the added options, method 200 proceeds directly to return step 255.

Returning to step 220, after an object outline, such as, for example, a DOM, is examined and objects of interest are identified, method 200 can also follow path P2 and proceed to step 245 where objects of interest are processed according to a predetermined set of instructions. For example, instead of waiting for a command from the network user to save objects of interest to their network account, objects of interest can be automatically identified and saved to a user's network account based on predetermined instructions processed by the user computer. The instructions can be defined by the network user and/or the network content provider. In one embodiment, the network user can specify the types of objects they want to automatically save, for example, they may want to save phone numbers and email addresses but not URLs. In one embodiment, all the objects that were saved in a web session can be presented to the user so that they can sort through them and delete the information that they do not desire. Following step 245, method 200 proceeds to return step 255 where the method 200 returns to step 215, and the user retrieves another electronic document. In addition, method 200 can also end in step 255.

Returning to step 220, processing of method 200 can follow path P3 to step 250. In step 250, the user side electronic document information extraction module 174 obtains content related to identified objects of interest from the network. For example, an identified object can be the name of a company and the content obtained can be stock charts for the company. Another example of an object of interest can be a movie title and the content obtained, can be for example a movie preview or show times at a local theatre. Still in other embodiments, a list of related RSS feeds that the user subscribes to or may want to subscribe to can also be obtained by the user computer.

In one embodiment, a user can maintain a list of predetermined keywords, that are identified by the user side electronic document information extraction module 174 as objects of interest. Information related to a user's keywords, such as, for example, RSS subscriptions related to the keyword, a search results list of the keyword, etc., can be sent to the user. Following step 250 processing proceeds to return step 255, where the method 200 can return to step 215, or alternatively, the method 200 can end.

Figure 3:
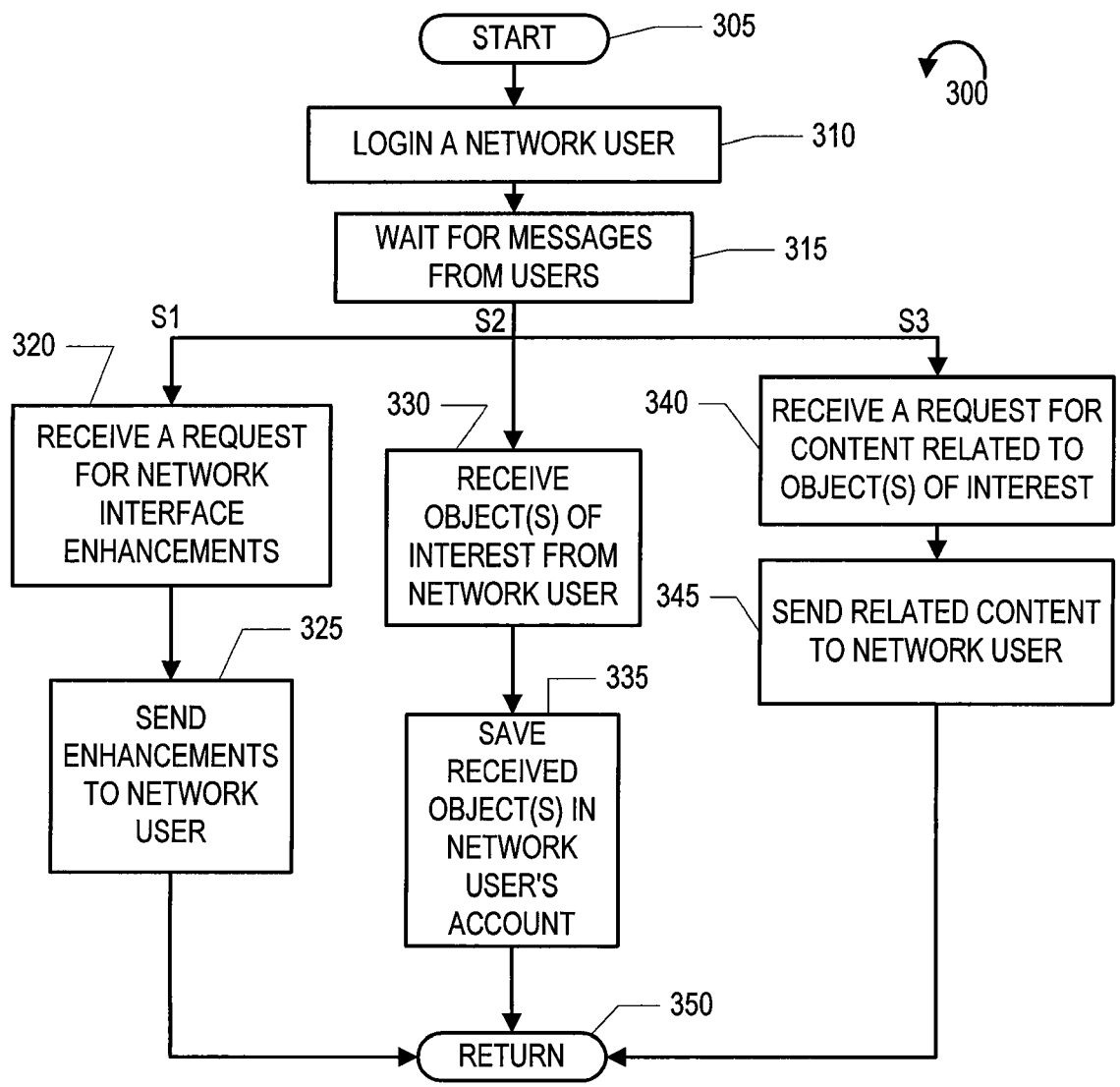
FIG. 3 illustrates a network content provider side electronic document information extraction method implemented according to an embodiment.

FIG. 3 illustrates an exemplary provider side electronic document information extraction method 300. In one embodiment, provider side electronic document information extraction module 140 of FIG. 1 can execute one instance of method 300. Method 300 begins in start step 305. Then, in step 310 the network content provider logs a network user into the system. As mentioned above, the user may be a default user.

After a user is logged into the system method 300 proceeds to step 315 where the network content provider computer 126 waits for messages from users. The network content provider one 126 can receive a variety of different messages. For example, following path SI method 300 can proceed from step 315 to step 320 where the network content provider one 126 receives a request for network interface enhancements. These network interface enhancements can include, for example, additional context menu items that allow a user to save an object to their network account and/or subscribe to an RSS feed. In one embodiment, the a downloadable network toolbar installed on the user computer is used to communicate between the user and the network content provider one 126.

Following step 320 method 200 proceeds to step 325 where the network content provider one 126 retrieves the enhancements and sends them to the network user computer 150. Following step 325, method 300 proceeds to return step 350 where method 300 returns to step 315 and the network content provider one 126 waits for messages from users.

From step 315, method 300 can also follow path S2 to step 330 where the network content provider one 126 receives objects of interest from a network user 150. A network content provider one 126 can receive objects of interest from a network user 150 in response to an automatic procedure and/or in response to a network user selecting a save option in a content menu. In one embodiment, the automatic procedure can be predefined by the network user 150 and/or the network content provider one 126. Following step 330, method 300 proceeds to step 335 where the received objects are saved into the network user's account. In one embodiment, the network content provider one 126 determines which network service or services to save the received object to before saving the object. Following step 335, method 300 returns to step 350 where the method 300 returns, for example, to step 315 and waits for additional messages from users.

From step 315, processing of method 300 can also follow path S3 to step 340 where a network content provider one 126 receives a request for content related to objects of interest. In an embodiment, an identified object of interest can be included in the request for related information. Thus, the network content provider one 126 can use the received object of interest to find information that is relevant to the object. In one embodiment, relevant information can be determined at the user computer and specific content can be requested from the network content provider one 126 in the request received in step 340.

Following step 340, the method 300 proceeds to step 345 where the network content provider one 126 retrieves information related to the objects of interest and sends the information to the network user 150. The retrieved information can comprise, in various embodiments, search results, RSS feeds, stock charts, weather reports, or any other information that can be found on the Internet. If the network user 150 has an account with the network content provider one 126, information can be selectively sent to the user 150 based on other information stored in the user' account. For example, only stock charts for companies in the network user's stock portfolio are sent down to the user 150 and/or only movie previews including the actor most researched by the network user 150 are sent down to the user 150. Selectively sending information also limits the number of large files sent to a network user 150, which may be a concern with some network connections.

Following step 345, method 300 returns in step 350 to step 315 where the network content provider one 126 waits for additional messages from users. Alternatively, the method 300 can end in step 350, for example, with a user logging off and/or timing out with the network content provider one 126.

Figure 4:
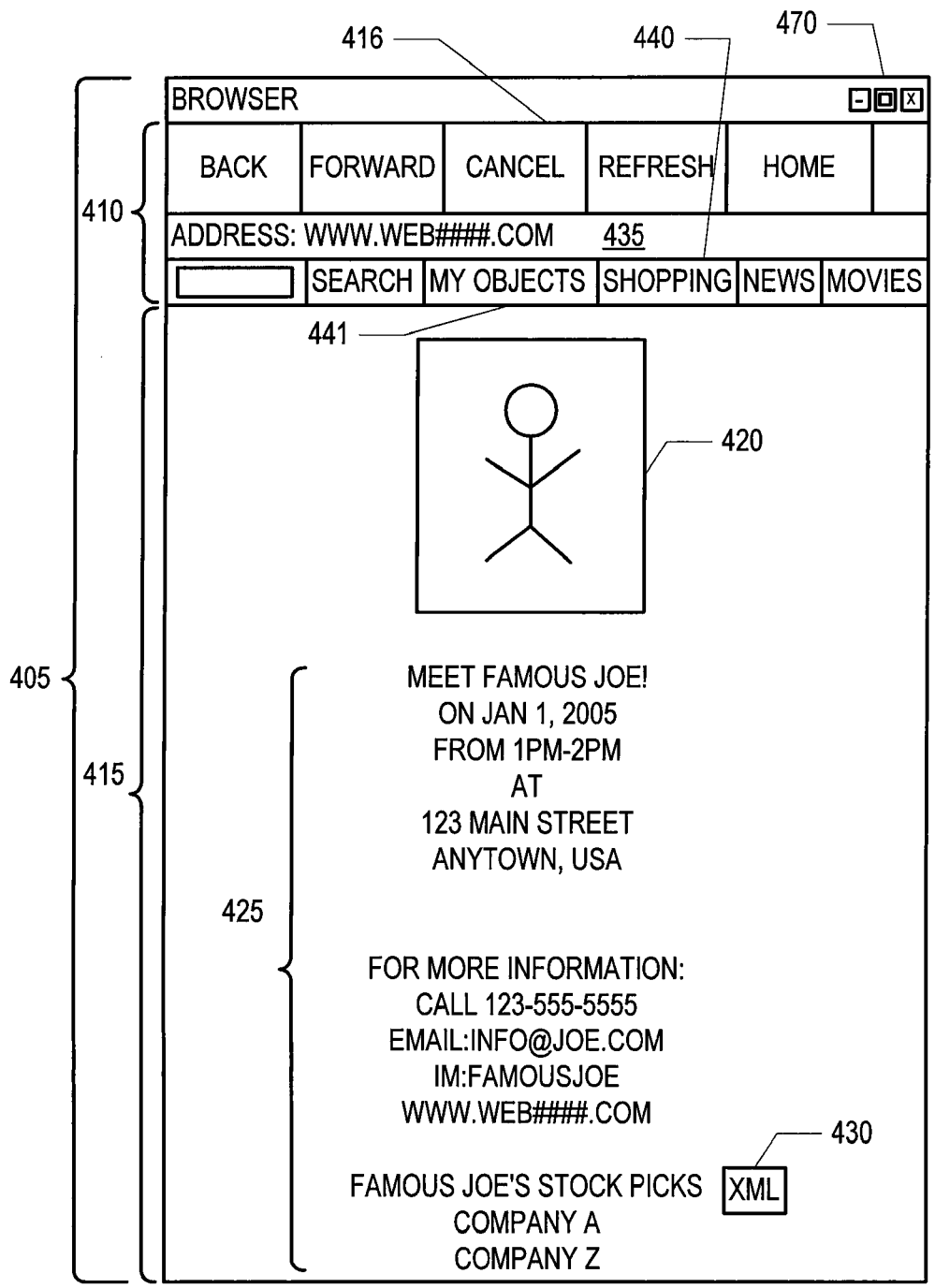
FIG. 4 illustrates an exemplary browser displaying an electronic document implemented according to an embodiment.

FIG. 4 illustrates an exemplary browser application interface 400 implemented in accordance with an embodiment. Browser interface 400 comprises an application window 405, a toolbar/menu section 410 and a display section 415. Browser application window 405 comprises control buttons 470 for minimizing, maximizing and closing the browser application window 405. Toolbar/menu display section 410 comprises one or more toolbars, menu bars and the like, used to aid a network user in browsing a network, such as, for example the Internet. Browser 400 comprises a standard toolbar 416, an address bar 435 and a downloadable network toolbar 440.

Network toolbar 440 comprises a dynamic button 441, which can change according to the object the user is interfacing with. In an embodiment, the user side electronic document information extraction module 174, can operate as part of a network toolbar application. Communication between the user computer 150 and the network content provider one 126 can be accomplished using the communication protocol of the network toolbar application. For example, the network toolbar 440 communicates with a network content provider to obtain one or more of the buttons the toolbar 440 displays, and to send information to the content provider, such as, for example, login information and search terms. Thus, identified objects of interest, related content and other information, can also be communicated between the user 150 and the network content provider one 126 through the toolbar 440 communication protocol.

Browser display section 415 can display electronic documents, such as, for example, webpages, to network users. Browser display section 415, in FIG. 4, illustrates an exemplary webpage for "Famous Joe". The webpage comprises a picture of Joe 420, information related to Joe 425, and an XML button 430. The information 425 reads, "Meet Famous Joe! on Jan. 1, 2005 from 1 p.m. to 2 p.m. at 123 Main Street, Anytown, USA. For more information call (123)555-5555, email: info@joe.com, IM: FamousJoe, www.web###.com. In addition, information on Joe's website also comprises Joe's stock picks which are Company A and Company Z.

When a webpage 400 such as the one illustrated in FIG. 4 is retrieved by a network user, a document outline, such as, for example, the DOM of the webpage 400, is analyzed to identify objects of interest. As mentioned above, in varying embodiments, the analysis can be performed at the user computer and/or at the network content provider. After objects of interest are identified or as objects of interest are identified, the network interface, which comprises the browser and the electronic document, can be augmented. Augmenting the network interface can include, in some embodiments, rewriting the code, for example, the HTML, that defines the electronic document. In one embodiment, augmentation allows the highlighting of objects of interest as shown in FIG. 5.

Figure 5:
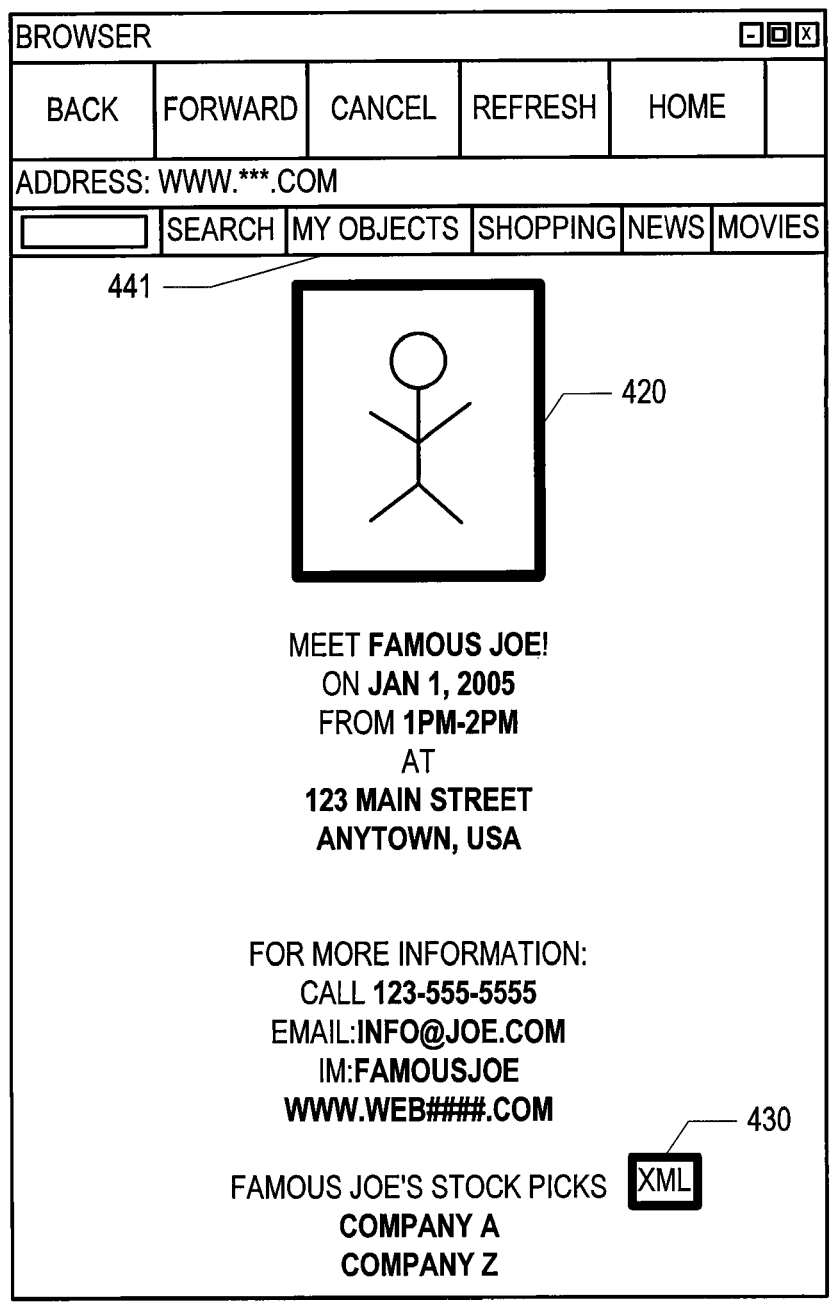
FIG. 5 illustrates an exemplary webpage with objects of interested bolded or highlighted according to an embodiment.

FIG. 5 illustrates an augmented web page 500 with a number of exemplary identifiable objects highlighted. Some exemplary objects of interest can include the photo 420, Joe's name, the date of the event, the time of the event, Joe's phone number, Joe's email address, Joe's IM identifier, Joe's webpage, the XML button 430 and the company names. In some embodiments, an augmented webpage highlights or otherwise augments all the identified objects in the document. In alternate embodiments, an identified object changes its appearance only after a user moves their pointer over the identified object. In one embodiment, when a user selects the "My Objects" button 441 of network toolbar 440, a separate browser, dialog or other window can appear displaying, for example, a list of the savable objects on the webpage 500, and/or previously saved objects.

Figure 6:
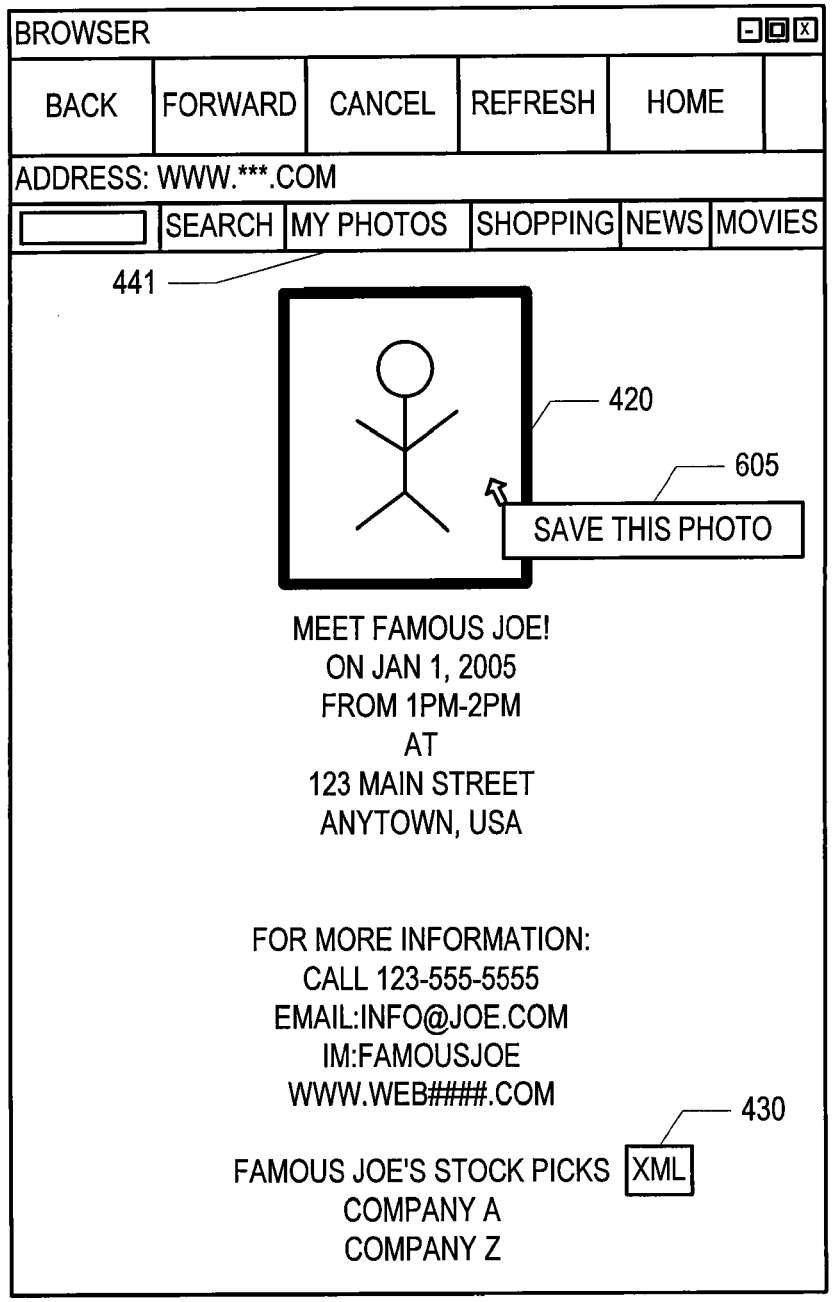
FIG. 6 illustrates a highlighted photograph and an exemplary context menu implemented according to an embodiment.

In FIG. 6, a user places their mouse pointer over the picture 420 and, in an embodiment, if a user right-clicks over the picture, a context menu 605, giving the user the option of saving the photograph, appears. In various embodiments, the save option can be the only item in the context menu 605, or the save option can be added to an existing context menu. In other embodiments, the context menu appears when the user hovers their mouse pointer over the image for a certain length of time, or after a user highlights a desired object. Selecting the save option in context menu 605, saves the photo 420 to the user's network account. The photo 420 can be saved in an online photo album and/or in an online address book.

In one embodiment, button 441 changes from "My Objects" to "My Photos" to correspond with the object that the user is currently working with. Selecting My Photos can send the user to their online Photo Album so they can see their newly added photo. In one embodiment, the button 441 can continuously change according to the object that the user's mouse is currently pointing at, and in one embodiment, the button 441 can change after a user saves an identified object.

Figure 7:
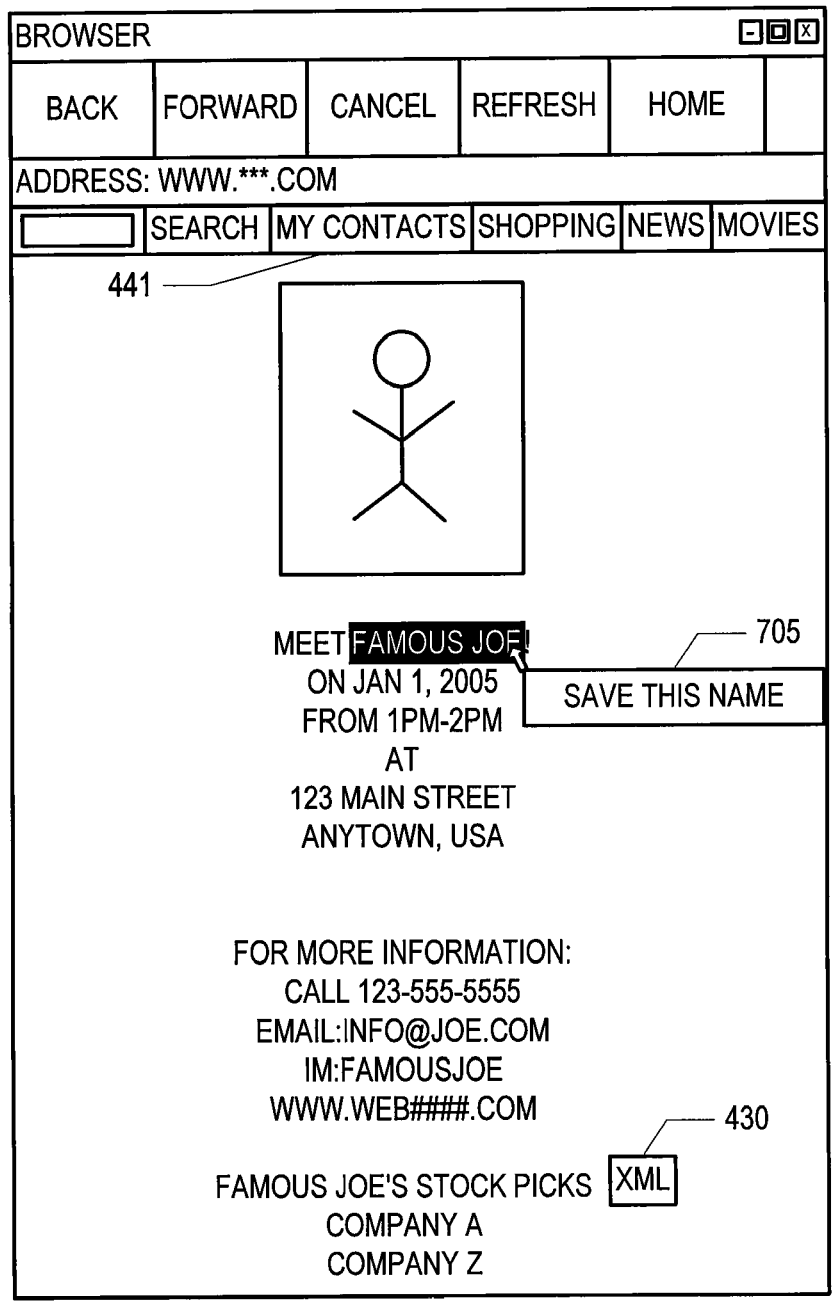
FIG. 7 illustrates a highlighted name and an exemplary context menu implemented according to an embodiment.

FIG. 7 illustrates the augmented webpage 500 with the name "Famous Joe" highlighted by the user. In addition, a context menu 705 giving the network user an option to save the name to their network account is also illustrated. As with the previous example, the context menu 705 can appear after a user right-clicks over a highlighted object or it can appear automatically after a user highlights a desired object. In one embodiment, button 441 can change to "My Contacts" to correspond with the network service that will use their saved object.

Figure 8:
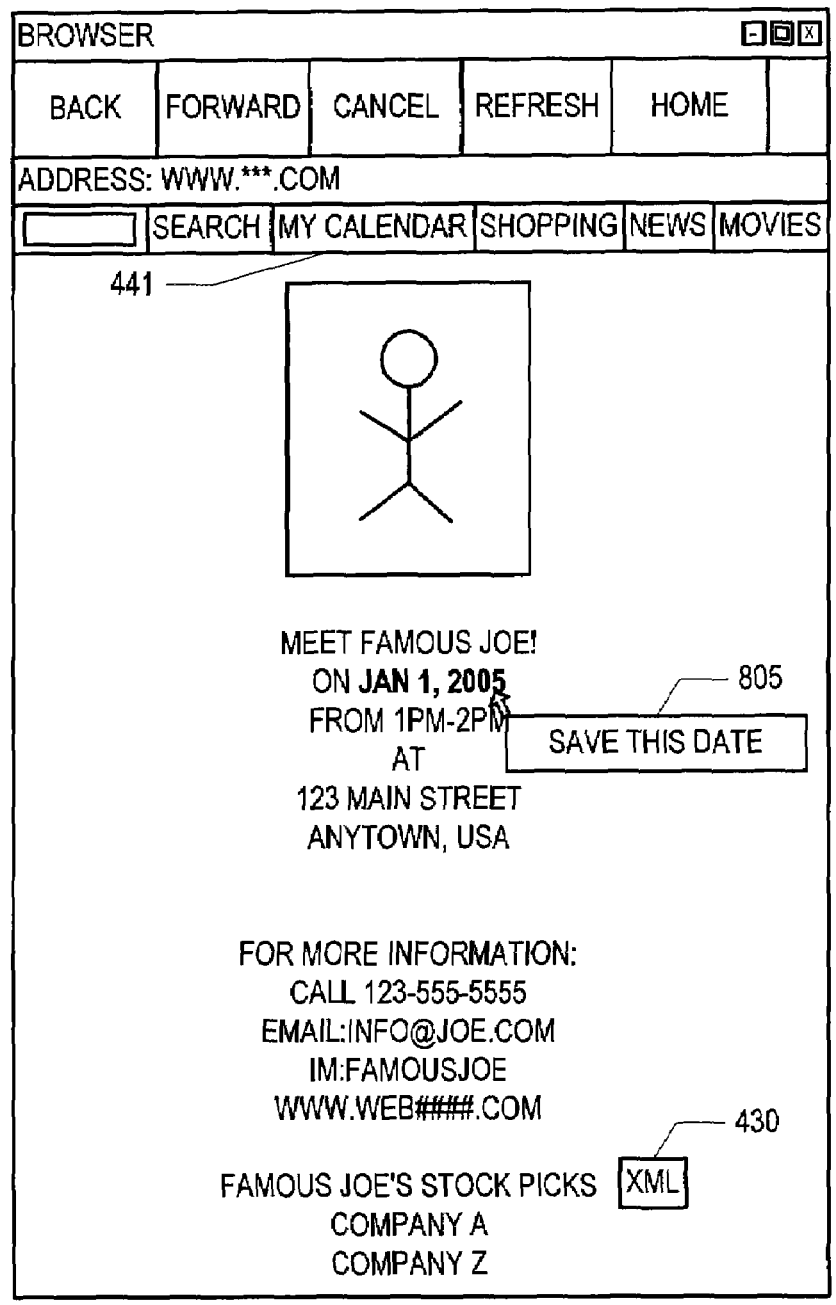
FIG. 8 illustrates a bolded date and an exemplary context menu implemented according to an embodiment.

FIG. 8 illustrates an embodiment where the date of an event has been bolded because a user moved their pointer over the date. When the user right-clicks on the date a context menu 805, giving the network user an option to save the date, appears. Selecting the save option in the context menu 805 automatically saves the date to the network user's online calendar. The description and time of the event can be determined automatically from surrounding information. In alternate embodiments, selecting the save option can open a separate window where the user can input additional information related to the date. In one embodiment, button 441 can change to "My Calendar."

Figure 9:
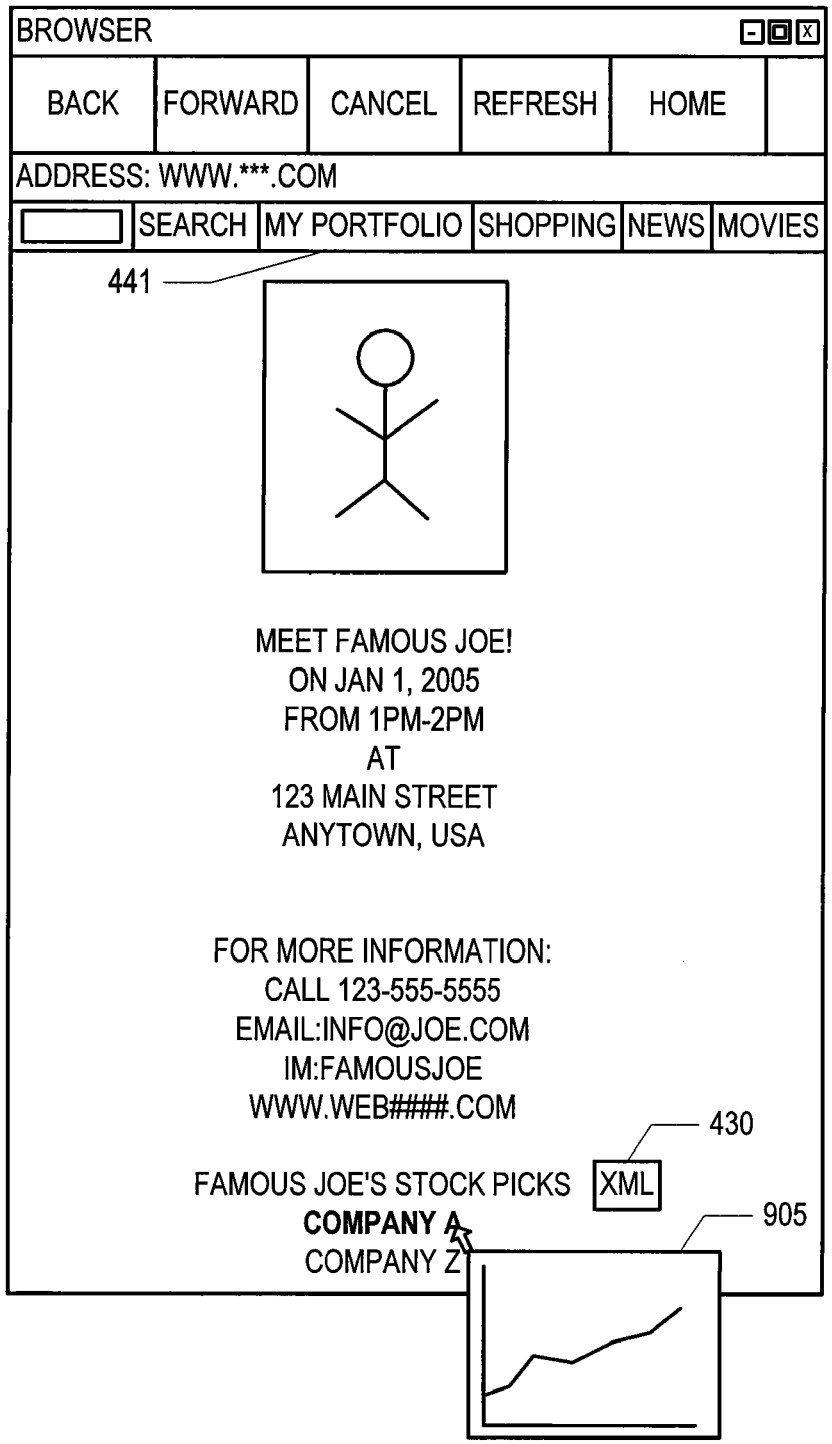
FIG. 9 illustrates a bolded company name with a corresponding stock chart that can be displayed to a user according to an embodiment.

In addition to saving objects of interest to a network user's account, a network user can also receive additional information related to identified objects from a network content provider 126. For example, FIG. 9 illustrates a stock chart 905 that is displayed when a network user places their pointer over the name of a company. In one embodiment, button 441 can change to "My Portfolio." Other information that can be sent to the user includes latest business news, a search result, and the like. In addition to company names, movies titles can display movie times, cars can display pricing and standard features, and songs titles can display a screen to the purchase the music or a music video to name a few.

Figure 10:
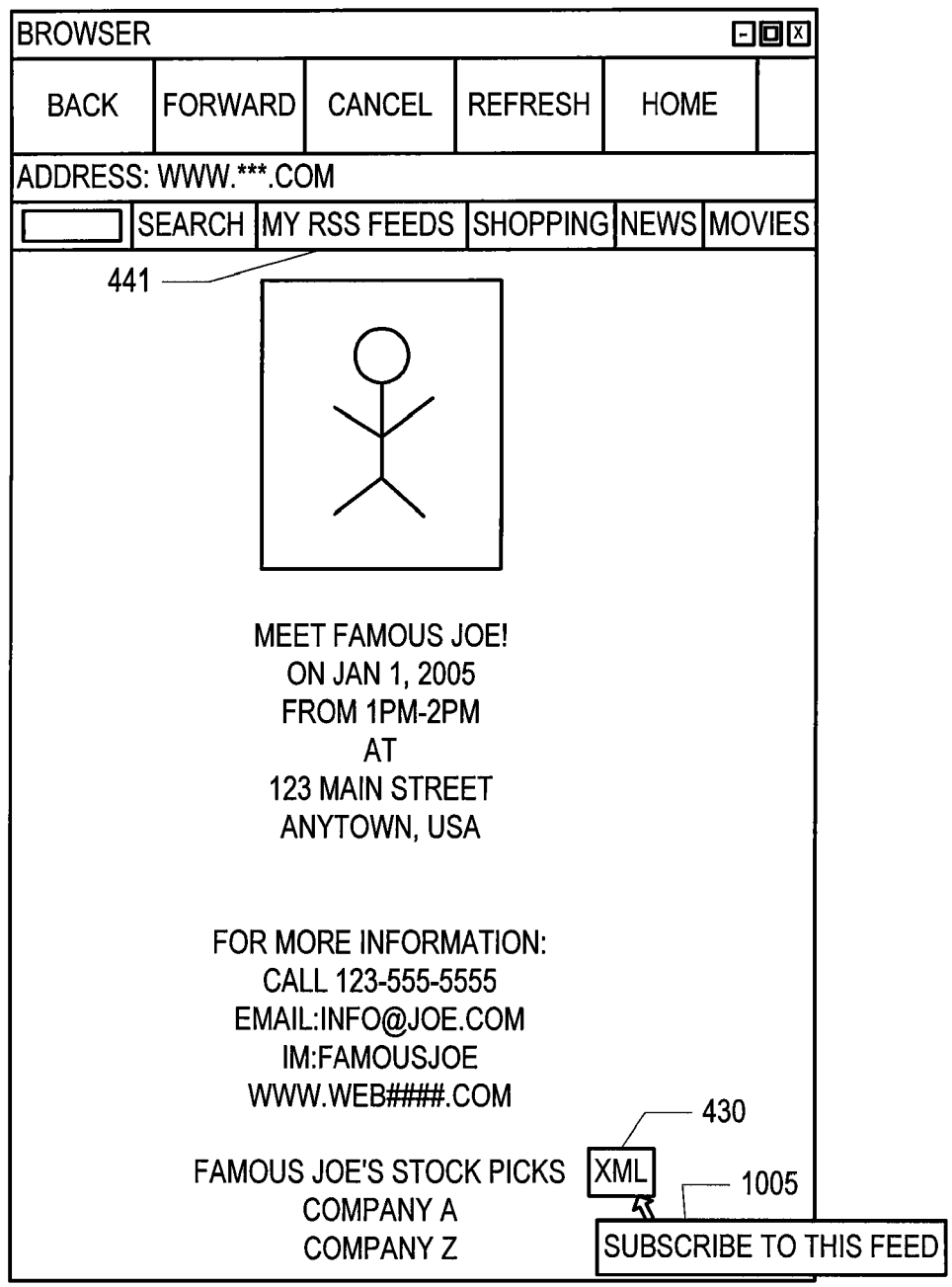
FIG. 10 illustrates an exemplary context menu comprising an option to subscribe to an RSS feed, implemented according to an embodiment.

FIG. 10 illustrates a user pointing at the XML button 430. Normally, when a person selects this button, the browser takes the user to a page with XML code. In one embodiment, a user 150 and/or a network content provider 126 can decide that links to RSS feeds are objects of interest. Therefore, in one embodiment, when an RSS feed link is identified in a webpage, the webpage is augmented so that when a user selects the RSS button, they are given a content menu 1005, that comprises an option to subscribe to the RSS feed.

In one embodiment, the button 441, changes to "My RSS Feeds." Selecting the button 441 can send the user to a webpage, for example, a personal web portal, that lists their RSS feeds. In one embodiment, the button 441 can display and/or scroll headlines from RSS feeds that the user is subscribed to, and/or selecting the button 441 can display a drop down menu, or other display, comprising all the headlines of a feed.

It will be recognized that while the features and functions described above are described in relation to network components and user side components, such features and functions can be implemented at any point in the network, on single or multiple computers and/or servers, and network functions can also be duplicated at the user computer for functioning independent of the network if desired. Thus, user side changes and or network side changes can be resolved and or synchronized when a user returns to the network in manners known in the art or hereafter to become known.

While the description of the various embodiments are described in a server/client network environment, alternate embodiments can be implemented in a peer-to-peer network or other interconnectivity schemes now known or hereafter to become known.

While there have been shown and described and pointed out fundamental novel features of the invention as applied to preferred embodiments thereof, it will be understood that various omissions and substitutions and changes in the form and detail may be made by those skilled in the art without departing from the spirit of the invention. It is the intention, therefore, to be limited only as indicated by the scope of the claims appended hereto.

What is claimed:

1. A method comprising:
   transmitting, over a network to a user computer associated with a network user having a network account with a network content provider, network content provider defined instructions for determining objects of interest in an electronic document visibly displayable on a display of the user computer, the instructions augmenting at least one of the determined objects of interest with additional information related to the at least one determined object of interest, said augmenting comprising modifying code of the electronic document associated with the determined object of interest, the additional information comprising content related to the at least one determined object of interest that also provides an indication of and a capability of additional functionality for the electronic document, said additional functionality is based on a type of the at least one object of interest and a determined identity of an Internet service having functionality for performing the additional functionality respective to the determined object of interest, and is automatically performed upon user selection;
   receiving at least one object of interest from the user computer, the at least one object of interest is selected by the user computer examining an object outline describing the electronic document, said user computer selection comprising extracting the at least one object of interest from the electronic document, said extraction of the at least one object of interest based on behavioral data of the network user and predetermined instructions received from the network user that identify a type of object the network user desires to have automatically saved in the user's network account; and saving the at least one object of interest in a database associated with the network user and the user's network account, the database is maintained by the network content provider.

2. The method of claim 1, wherein the network content provider defined instructions are created based on user information stored in the database associated with the network user.

3. The method of claim 1, the network content provider defined instructions are created based on network content provider preferences.

4. The method of claim 1, further comprising determining at least one network service to which to save the at least one object of interest.

5. The method of claim 4, wherein the at least one object of interest is an email address and wherein the network content provider determines that the email address is saved to a contacts service.

6. The method of claim 4, wherein the at least one object of interest is a date and wherein the network content provider determines that the date is saved to an online calendar.

7. The method of claim 4, wherein the at least one object of interest is an Internet address and wherein the network content provider determines that the Internet address is saved to a shortcuts service.

8. The method of claim 1, wherein the object outline is a document object model.

9. The method of claim 1, wherein the at least one object of interest is automatically sent to the network content provider.

10. The method of claim 1, further comprising receiving a request for a browser interface enhancement, wherein the browser interface enhancement is a context menu item.

11. The method of claim 1, wherein communication between the network user and the network content provider is made using a downloadable network toolbar communication protocol.

12. The method of claim 1, wherein the at least one object of interest is a target object of a universal resource identifier, and wherein the target object is extensible markup language for real simple syndication.

13. A network computer tangibly comprising:

instruction transmission computer code, the instruction transmission computer code being executed to transmit, over a network to a user computer associated with a network user having a network account with a network content provider, network content provider defined instructions for determining objects of interest in an electronic document visibly displayable on a display of the user computer, the instructions augmenting at least one of the determined objects of interest with additional information related to the at least one determined object of interest, said augmenting comprising modifying code of the electronic document associated with the determined object of interest, the additional information comprising content related to the at least one determined object of interest that also provides an indication of and a capability of additional functionality for the electronic document, said additional functionality is based on a type of the at least one object of interest and a determined identity of an Internet service having functionality for performing the additional functionality respective to the determined object of interest, and is automatically performed upon user selection;

object receiving computer code, the object receiving computer code being executed to receive at least one object of interest from the user computer, the at least one object of interest is selected by the user computer examining an object outline describing the electronic document, said user computer selection comprising extracting the at least one object of interest from the electronic document, said extraction of the at least one object of interest based on behavioral data of the network user and predetermined instructions received from the network user that identify a type of object the network user desires to have automatically saved in the user's network account; and object saving computer code, the object saving computer code being executed to save the at least one object of interest in a database associated with the network user and the user's network account, the database is maintained by the network content provider.

14. The network computer of claim 13, wherein the network content provider defined instructions are created based on user information stored in the database associated with the network user.

15. The network computer of claim 13, further comprising determination computer code, the determination computer code configured to determine at least one network service to which to save the at least one object of interest.

16. The network computer of claim 13, wherein the user computer comprises a downloadable toolbar stored thereon and wherein the network computer and the user computer communicate through a downloadable toolbar protocol.

17. A graphical user interface visibly displayed on a display of a user computer comprising:

a user control section visibly displayed on the display of the user computer, the user control section comprising at least one button, the at least one button being configured to initiate a browser command; and a browser display area visibly displayed on the display of the user computer, the browser display area being configured to display an electronic document, the electronic document comprising objects of interest and at least one augmented object of interest selected from the objects of interest that comprise the electronic document, said augmented object comprising code that modifies code of the electronic document associated with the determined object of interest, the at least one augmented object of interest being selected by the user computer based on instructions defined by a network content provider and based on behavioral data of a network user and predetermined instructions received from the network user that identify a type of object the network user desires to have automatically saved in a user network account associated with the network work user, wherein said selected object of interest is extracted from the electronic document, the at least one augmented object of interest comprising additional information, the additional information comprising content related to the at least one determined object of interest that also provides an indication of and a capability of additional functionality for the electronic document, said additional functionality is based on a type of the at least one object of interest and a determined identity of an Internet service having functionality for performing the additional functionality respective to the determined object of interest, and is automatically performed upon user selection.

18. The graphical user interface of claim 17, wherein the at least one object of interest is augmented by changing the at least one object of interest into a hyperlink.

19. The graphical user interface of claim 17, wherein the augmentation to the at least one object of interest is not visible to a network user until the user interacts with the at least one object of interest.

20. The graphical user interface of claim 17, further comprising a context menu, the context menu comprising an item that can be selected to save the at least one augmented object of interest to a database associated with the network user, wherein the database is maintained by the network content provider.

21. The graphical user interface of claim 20, wherein the user control section comprises a downloadable network toolbar and the additional context menu item is received using a network toolbar communication protocol.

22. The graphical user interface of claim 20, wherein the user control section comprises a downloadable network toolbar and the at least one augmented object of interest is transmitted to the network content provider using a network toolbar communication protocol.

23. The graphical user interface of claim 17, wherein the user control section comprises a downloadable network toolbar, and wherein communication between the user computer and the network content provider is made using a network toolbar communication protocol.

24. The graphical user interface of claim 23, wherein the toolbar comprises a dynamic button, the dynamic button being configured to be a shortcut to one of a plurality of network services offered by the network content provider, the one service being selected based on a last augmented object of interest that a user interacts with.

25. The graphical user interface of claim 17, wherein the at least one augmented object of interest is a real simple syndication feed indicator, and wherein selection of the indicator by a user results in the display of a prompt providing the user with an option to add the real simple syndication feed to the user's real simple syndication aggregator, and wherein previous to augmentation, the at least one object of interest was a link to an extensible markup language web page.

\* \* \* \* \*